(12) United States Patent
Park et al.

(10) Patent No.: US 7,328,449 B1
(45) Date of Patent: Feb. 5, 2008

(54) DATA CONTENTS PROCESSING METHOD AND APPARATUS

(75) Inventors: Suk Won Park, Seoul (KR); Dong Ik Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 704 days.

(21) Appl. No.: 09/709,303

(22) Filed: Nov. 13, 2000

(30) Foreign Application Priority Data

Nov. 12, 1999 (KR) ................................ 1999-50280

(51) Int. Cl.
 *H04N 7/10* (2006.01)
 *H04N 7/025* (2006.01)
 *H04N 5/445* (2006.01)
 *G06F 13/00* (2006.01)
 *G06F 3/00* (2006.01)

(52) U.S. Cl. .................. 725/40; 725/32; 725/34; 725/36

(58) Field of Classification Search .................. 725/38, 725/40, 51, 110, 112, 136, 109, 135, 32, 36, 725/34, 48
See application file for complete search history.

(56) References Cited

U.S. PATENT DOCUMENTS

| | | | | |
|---|---|---|---|---|
| 6,058,430 A * | 5/2000 | Kaplan | ...................... | 709/245 |
| 6,061,719 A * | 5/2000 | Bendinelli et al. | .......... | 709/218 |
| 6,240,555 B1 * | 5/2001 | Shoff et al. | ................. | 725/110 |
| 6,430,743 B1 * | 8/2002 | Matsuura | ..................... | 725/112 |
| 6,460,180 B1 * | 10/2002 | Park et al. | ..................... | 725/40 |
| 6,601,103 B1 * | 7/2003 | Goldschmidt Iki et al. | . | 709/231 |
| 6,785,902 B1 * | 8/2004 | Zigmond et al. | ............. | 725/38 |
| 2002/0038344 A1 * | 3/2002 | Ullman et al. | ............. | 709/203 |
| 2003/0115612 A1 * | 6/2003 | Mao et al. | .................. | 725/136 |
| 2003/0126621 A1 * | 7/2003 | Leak et al. | ................. | 725/135 |

* cited by examiner

*Primary Examiner*—Hunter Lonsberry
(74) *Attorney, Agent, or Firm*—Birch, Stewart, Kolasch & Birch, LLP

(57) ABSTRACT

The present invention relates to a data contents processing method and apparatus for processing and displaying data contents in relation with a TV program in a DTV having a browser function. The data contents processing method according to the present invention includes the steps for: separating audio/video (A/V) signals and data contents upon receipt of a broadcast signal and extracting information on the currently received channel and a program identifier; constructing a database by forming an integrated information of a channel/program identifier information and data contents in connection with each other; controlling the conversion of data contents by checking whether or not the data contents to be displayed are consistent with the current A/V signal according to the integrated information; and, when the data contents is converted to thus select a user-desired data contents, displaying the A/V signal and the data contents.

30 Claims, 3 Drawing Sheets

DATA CONTENTS PROCESSING METHOD AND APPARATUS

BACKGROUND OF THE INVENTION

1. Field of the Invention

The present invention relates to a digital television (DTV) receiving a data broadcast, and more particularly, to a data contents processing method and apparatus for processing and displaying data contents in relation with a TV program in a DTV having a browser function.

2. Description of the Background Art

Generally, an internet-based web browser has a function of showing the contents of a previously surfed page again according to a user's request, after the user has surfed or navigated the web page. That is, since all conventional browsers are manufactured on an internet basis, when the above-said browsers are connected to the internet via a certain network (PPP, ISDN, ASDL, FDDI, ATM, and Ethernet), the user can navigate the web page that he or she has viewed using the forward/backward function included in the browser. At this time, in the state that, although the user has ever navigated the web page, the web page is deleted from the cache of the browser, if the user wants to view the deleted web page again using the backward function of the browser, the browser downloads and displays the contents of the deleted web page via the network.

Meanwhile, in the case that the browser having the above-said function is applied to a TV, when certain contents related to A/V streams are navigated via the browser, there occurs a problem that the contents requested by the user do not exist in a local memory, or the contents having no relation with the currently displayed A/V streams are displayed. The problem occurring when the browser is applied to the TV will now be described in detail with reference to the accompanying drawings.

FIG. 1A is an image of A/V streams and TV data contents not being consistent with each other, when a channel is converted by pressing the channel forward/backward key in a digital television having a browser function according to the conventional art. If the channel is converted to a 'soccer' program in the state that data contents relating to the 'Han River' are displayed on a screen, as illustrated therein, the data contents relating to the 'Han River' are displayed as they are, and only the channel is converted to the 'soccer' game, thus simultaneously displaying the data contents relating to the 'Han River' and the A/V streams relating to the 'soccer' game program.

FIG. 1B is an image of A/V streams and TV data contents not being consistent with each other, when a navigation is performed using the forward/backward function of a browser in a digital television having a browser function according to the conventional art. If the forward/backward function key of the browser is pressed when a 'soccer' program is displayed on the screen, as illustrated therein, the A/V stream relating to the 'soccer' program are displayed as they are, and only the data contents are changed into the contents relating to the 'Han River', thus simultaneously displaying the A/V streams relating to the 'soccer' game program and the data contents relating to the 'Han River'.

Generally, since a TV is connected to each independent channel (or network) to be connected to the corresponding independent network whenever the channel is changed, and channels, programs and contents are managed in separate groups, the TV to which a conventional browser technique exclusively used for the internet is adapted cannot maintain the relation between the currently displayed A/V streams and the corresponding data contents. Accordingly an image of the data contents and the A/V streams not being consistent with each other are displayed.

Consequently, the TV having the conventional browser function cannot reliably provide broadcasting to viewers by displaying A/V streams and TV data contents that are consistent with each other.

SUMMARY OF THE INVENTION

Accordingly, it is an object of the present invention to provide a data contents processing method and apparatus for processing and displaying data contents in relation with A/V streams displayed in a DTV having a browser function.

It is another object of the present invention is to provide a data contents processing method and apparatus for processing and displaying data contents in relation with A/V streams in correspondence to a TV channel conversion or forward/backward of a browser in a DTV having a browser function.

To achieve the above objects, there is provided a data contents processing method according to the present invention which includes the steps for: separating audio/video (A/V) signals and data contents upon receipt of a broadcast signal and extracting information on the currently received channel and a program identifier, constructing a database by forming an integrated information of a channel/program identifier information and data contents in connection with each other; controlling the conversion of data contents by checking whether or not the data contents to be displayed are consistent with the current A/V signal according to the integrated information; and, when the data contents is converted to thus select a user-desired data contents, displaying the A/V signal and the data contents.

In addition, there is a provided a data contents processing method according to the present invention which includes the steps for: separating audio/video (A/V) signals and data contents upon receipt of a broadcast signal of a bit stream and extracting information on the channel of the broadcast signal corresponding to the bit stream and a program identifier; constructing a database by forming an integrated information of a channel information, program identifier, and data contents in connection with one another; judging whether or not the data contents to be displayed and the current A/V signal are consistent with each other according to the integrated information; and, if the data contents to be displayed are not consistent with the current A/V signal according to the integrated information, displaying the A/V signal and the received data contents being consistent with each other upon receipt of the data contents corresponding to the A/V signal.

In addition, there is provided a data contents processing apparatus according to the present invention which includes: an inverse multiplexing unit for separating audio/video (A/V) signals and data contents upon receipt of a bit stream of a digital broadcast signal and extracting information on a broadcast channel corresponding to the bit stream and a program identifier; a database constructing unit for constructing a database by forming an integrated information of channel/program identifier information and data contents in connection with each other; an A/V data interface unit for receiving the integrated information of the database constructing unit, checking whether or not the data contents to be currently displayed are consistent with the A/V signal separated from inverse multiplexing unit, and controlling the conversion of data contents or conversion of a channel according to a user's request; a browser unit for conducting a navigation of data contents and selecting desired data contents from the constructed database according to the control of the A/V data interface control unit; and a display unit for displaying the A/V signal and data contents outputted from the browser.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1A:
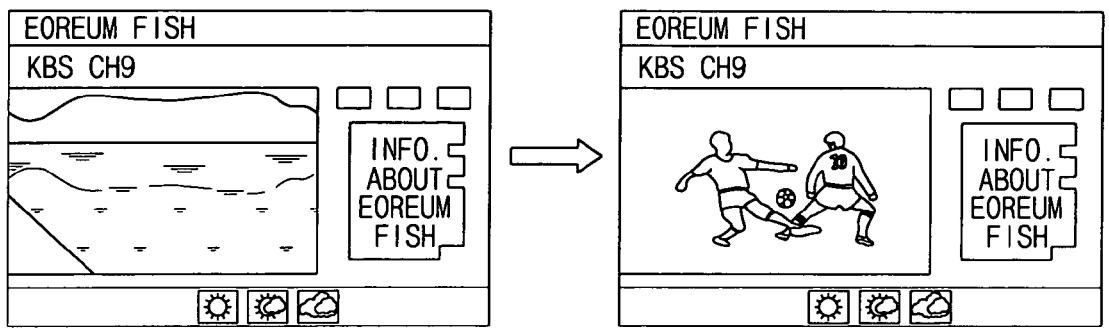
FIG. 1A is an image of A/V streams and TV data contents not being consistent with each other, when a channel is converted by pressing the channel forward/backward key in a digital television having a browser function according to the conventional art.
Figure 1B:
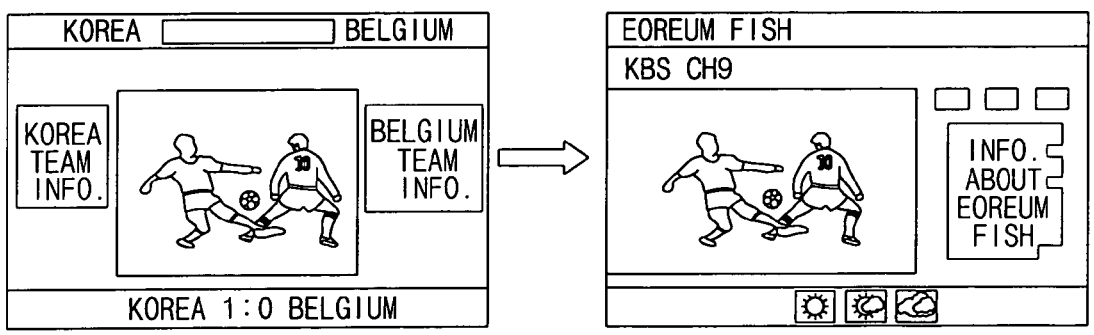
FIG. 1B is an image of A/V streams and TV data contents not being consistent with each other, when a navigation is performed using the forward/backward function of a browser in a digital television having a browser function according to the conventional art.
Figure 2:
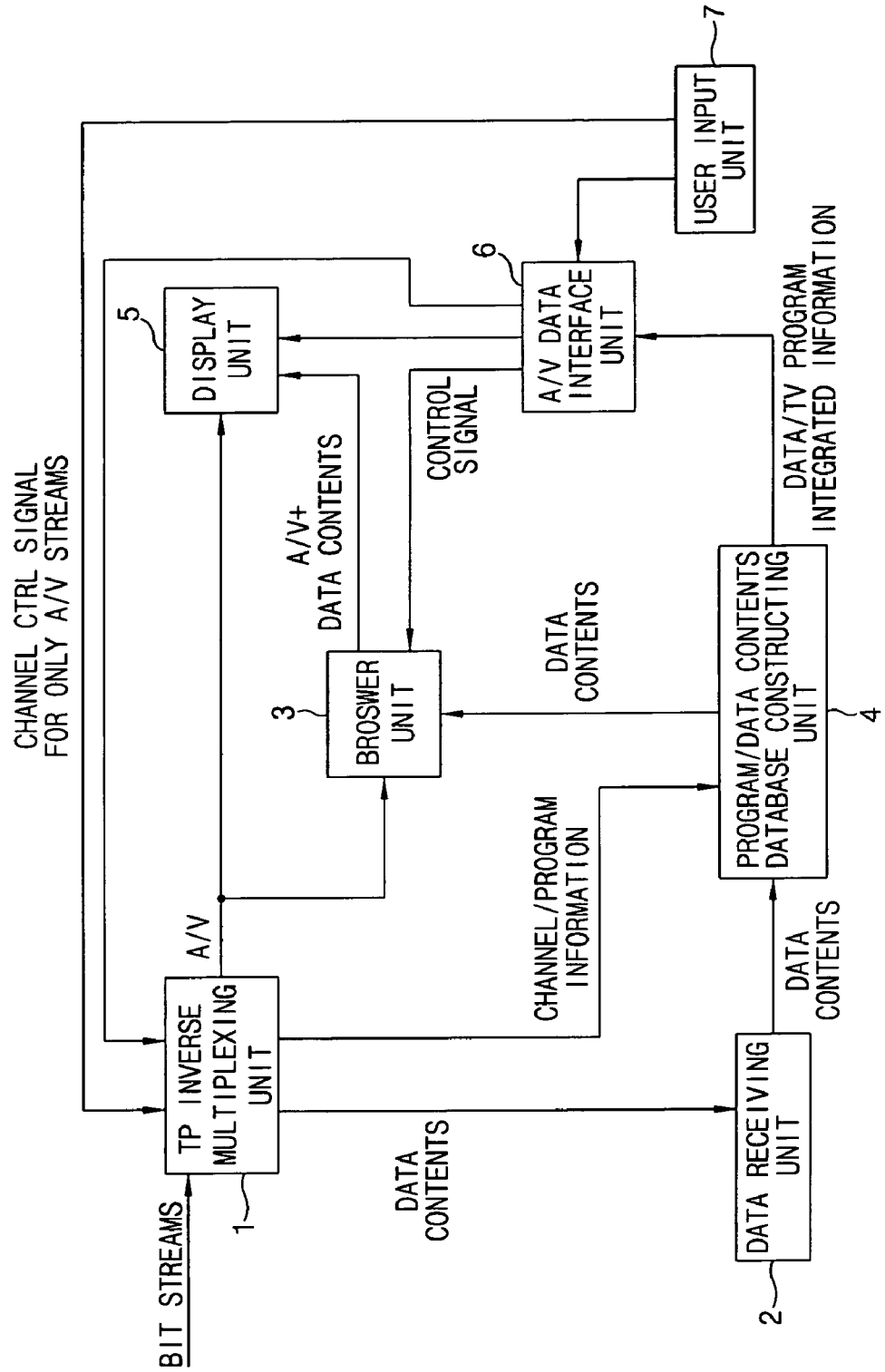
FIG. 2 is a view illustrating the construction of a data contents processing apparatus according to an embodiment of the present invention.

FIG. 2 is a view illustrating the construction of a data contents processing apparatus according to an embodiment of the present invention, which includes: a transport (TP) inverse multiplexing unit 1 for receiving a bit stream from a tuner (not shown) tuned to receive a digital television signal and separating audio/video (A/V) signals and data contents for thereby outputting the same; a display unit 5 for displaying the A/V signals outputted from the TP inverse multiplexing unit 1; a data receiving unit 2 for storing the data contents; a database constructing unit 4 for constructing a database as an integrated information generated by connecting the channel/program identifier information from the bit stream inputted from the TP inverse multiplexing unit 1 with the data contents stored in the data receiving unit 2; a browser unit 3 for receiving the A/V stream outputted from the TP inverse multiplexing unit 1 and the data contents outputted from the database constructing unit 4 and displaying the previously navigated A/V stream and data contents to the display unit 5 using the forward/backward function according to a predetermined control signal; an A/V data interface control unit 6 for controlling the browser unit 3 and the TP inverse multiplexing unit 1 so that the data contents to be currently displayed from the integrated information of the database constructed in the database constructing unit 4 are consistent with the currently displayed A/V stream; and a user input unit 7 for controlling the TP inverse multiplexing unit 1 and the A/V data interface control unit in order to convert a channel or control the forward/backward function of the browser.

The operation of the thusly constructed data contents processing apparatus according to the present invention will now be described with reference to the accompanying drawings.

Figure 3:
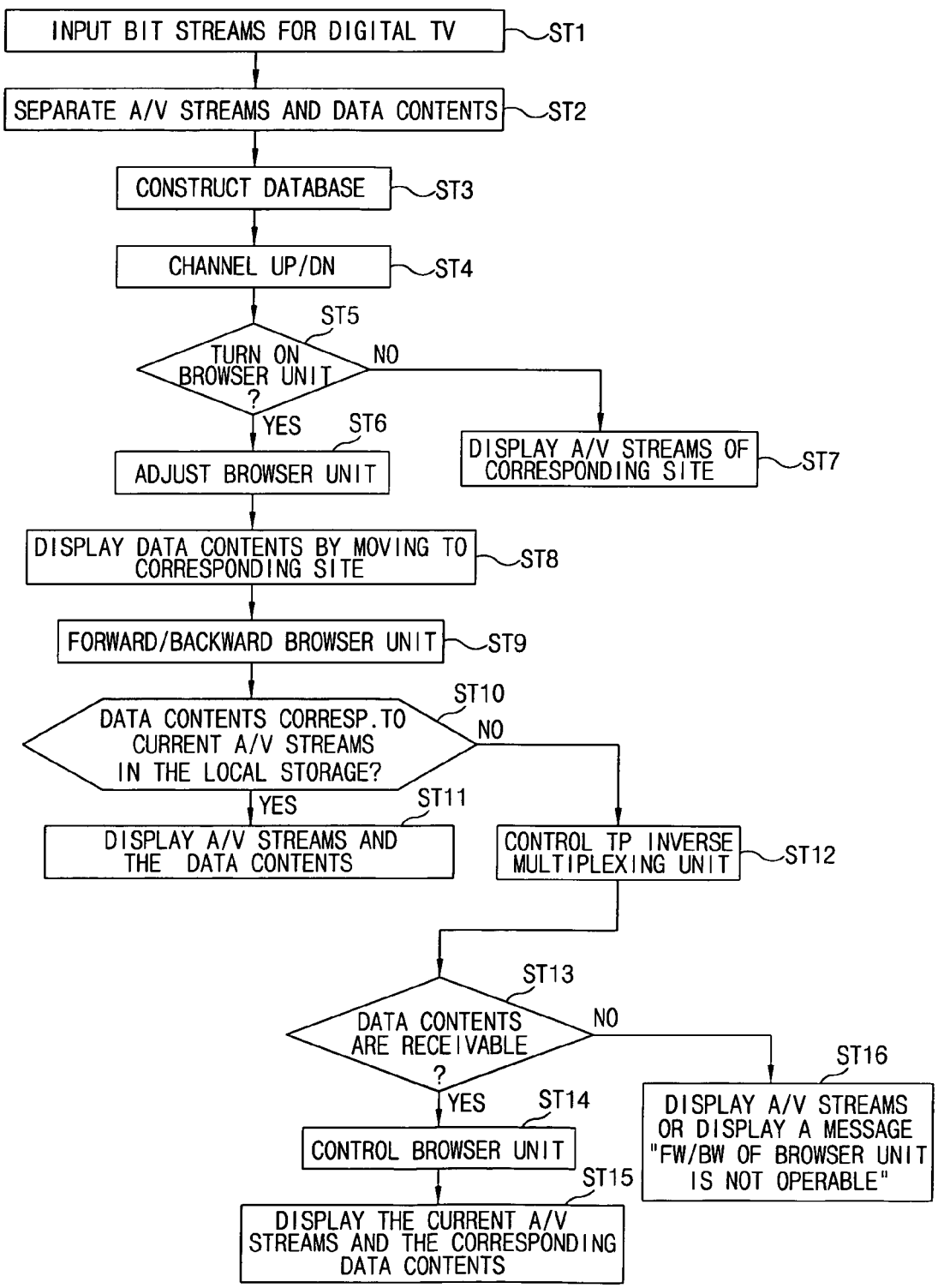
FIG. 3 is a flow chart illustrating a data contents processing method according to an embodiment of the present invention.

FIG. 3 is a flow chart illustrating a data contents processing method according to the present invention.

First, when a digital television is operated and thus a bit stream is inputted into the TP inverse multiplexing unit 1 in ST1, the TP inverse multiplexing unit 1 separates an A/V stream and data contents from the bit stream for outputting the same according to the control of a user input unit 7 and the A/V data interface control unit 6 in ST2. At this time, the A/V stream is displayed after passing through a decoding procedure in the display unit 5, and the data contents separated from the TP inverse multiplexing unit 1 are stored in the data receiving unit 2.

Meanwhile, the database constructing unit 4 receives channel/program identifier information from the TP inverse multiplexing unit 1 and receives the data contents stored in the data receiving unit 2, generates an integrated information by connecting them with each other, and constructs a database using the integrated information in ST3. That is, the database constructing unit 4 generates a data structure so that the data contents are connected with the corresponding program for management.

Here, the channel/program identifier is generally an intrinsic identifier related to a IV program transmitted from a broadcasting station for a DTV, for example, a channel ID, program ID, and contents ID.

The above data structure is a table format formed when the database constructing unit 4 receives data contents outputted from the data receiving unit 2 and the data contents ID, program ID corresponding to the data contents, and channel ID corresponding to the program are connected with one another. In another case, the data structure is a tree format in which a plurality of programs included in one channel are connected to the channel and a plurality of data contents included in each program are connected to the program.

When the thusly inputted data contents are constructed as a database in the database constructing unit 4, the display unit 5 displays the A/V stream corresponding to the data contents.

At this time, when the user adjusts a channel upwardly/downwardly by controlling the TP inverse multiplexing unit 1 through the user input unit 7, the TV program corresponding to the channel, and at the same time judges if the browser unit 3 is in an operable state in ST5. If the browser is in the OFF state, the A/V stream of the corresponding channel selected by the user is displayed in ST7.

Meanwhile, if the browser unit 3 is in the ON state, it is adjusted according to a user command in ST6, is moved to the corresponding site, and receives the data contents provided from the site for thereby displaying the same in ST8.

At this time, when the forward/backward function of the browser unit 3 is selected by adjusting the browser unit 3, it is judged whether or not the data contents corresponding to the current A/V stream are stored in a local storage unit of the browser 3 in ST10. If stored, the A/V stream and the corresponding data contents are displayed in ST11. If the data contents corresponding to the current A/V stream are not stored in the local storage unit of the browser, the TP inverse multiplexing unit 1 is controlled in ST12.

Next, it is judged whether or not the TP inverse multiplexing unit 4 can receive the data contents in ST13. If the data contents are receivable, the browser 3 is controlled in ST14, and the current A/V stream and the corresponding data contents are displayed in ST15. If the data contents are not receivable, the message that the A/V stream cannot be displayed, or the message that the browser cannot be controlled by the forward/backward function thereof is displayed in ST16.

This will now be described in more detail.

The A/V data interface control unit 6 checks whether or not the data contents to be currently displayed are consistent with the A/V stream. If not consistent, the TP inverse multiplexing unit 1 and the browser unit 3 are adjusted. In other words, when the user converts a channel by means of a channel up/down key in the state that the contents are displayed, the above display is controlled so that the currently displayed contents are shut down from the screen, and the browser unit 3 is controlled so that it receives the contents connected to the program ID of the converted channel from the database constructing unit 4 for outputting the same. For example, when the user converts the channel into a channel broadcasting a 'soccer' game by means of the channel up/down key in the state that the data contents related to the 'Han River', the A/V data interface control unit 6 controls the browser 3 to receive the data contents related to the 'soccer' game from the database constructing unit 4, and controls the display unit 5 to display the A/V stream and the data contents at the same time.

Therefore, the 'soccer' game is displayed on the screen in moving images, the corresponding data contents are displayed thereon.

At this time, when the previously displayed documentary related to the 'Han River' is selected again by using the channel up/down key, the data contents and A/V stream related to the 'Han River' are displayed again.

For example, when the user selects the data contents related to the 'soccer' game using the forward/backward function of the browser in the state that the data contents related to the 'Han River' are displayed, the TP inverse multiplexing unit 1 receives the channel broadcasting the 'soccer' game according to the control of the A/V data interface control unit 6, and accordingly the A/V stream corresponding to the 'soccer' game and the data contents related to the 'soccer' game are displayed on the screen at the same time.

As described above, in the case that the user displays the data contents through the browser, it is possible to convert currently displayed channel into the channel related to the data contents by only performing a navigation through the browser. In addition, in the case that the user displays the data contents of the an previously displayed channel under the condition that the TV channel has been converted by means of the channel up/down key, it is possible to convert the channel into the previous channel related to the data contents.

Meanwhile, when the user converts the TV channel by means of the channel up/down key, it is possible to convert current data contents displayed in browser into the data contents corresponding to the converted channel. In addition, in the case that the user wants to display the previously viewed data contents, if the current channel is not a channel having received the data contents to be displayed, the channel is converted into the channel related to the data contents for thereby enabling displaying of the data contents. Even though the previously displayed contents have been lost in the local storage unit, it is possible to automatically convert currently channel displayed into the channel related to the contents and newly receives data for displaying the same.

Consequently, the user can convert the TV channel based on the contents in the browser as well as based on the channel key. In other words, when the channel is converted by the channel up/down key, the current data contents are changed into the data contents corresponding to the converted channel, whereby the current channel is converted into the channel corresponding to the data contents.

As described above, in the data contents processing method and apparatus according to the present invention, the user can view the A/V stream corresponding to the previously viewed contents by connecting the A/V stream with the data contents. In particular, the user can converts a channel by navigation in the browser, which is more effective in a broadcast providing a data-based service.

In addition, when the user wants to display the contents that have disappeared from the local storage unit of the browser, the current channel is automatically converted to a channel transmitting data to be displayed for enabling receiving of the contents. Therefore, the conventional method for using a browser in the internet environment can be used as it is.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A data contents processing method, comprising:
    separating audio/video (A/V) signals and data contents upon receipt of a broadcast signal and extracting information on a current channel and a program identifier, wherein the data contents are related to a television program;
    constructing a database by forming an integrated information of a channel/program identifier information and data contents in connection with each other, wherein the channel/program identifier information is an intrinsic identifier related to the television program, and the intrinsic identifier includes a television channel ID, television program ID, and data contents ID;
    checking whether or not the data contents to be displayed are consistent with the current A/V signal according to the integrated information;
    performing conversion of data contents if it is found that the data contents to be displayed are not consistent with the current A/V signal, and not performing the conversion of the data contents if it is found that the data contents to be displayed are consistent with the current A/V signal; and
    displaying the A/V signal and the data contents,
    wherein the conversion of data contents includes receiving data content consistent with the current A/V signal, and
    wherein, in the performing step, when user-desired data contents are selected by means of a browser for controlling data contents, the current channel is tuned in to a new channel corresponding to the selected data contents.

2. The method according to claim 1, wherein the performing step further comprises controlling a channel conversion.

3. The method according to claim 1, wherein, in the performing step, when the user converts the current channel to a new channel using a channel converter, data contents corresponding to the new channel are selected.

4. The method according to claim 1, wherein the displaying step further comprises displaying only the broadcast channel corresponding to the A/V signal.

5. The method according to claim 1, wherein the data contents processing method further comprises:
    adjusting a channel so as to display A/V signals or A/V signals and data contents, or
    inputting a user command signal corresponding to a forward/backward function of a browser.

6. A data contents processing method, comprising:
    separating audio/video (A/V) signals and data contents upon receipt of a broadcast signal of a bit stream and extracting information on a current channel of the broadcast signal corresponding to the bit stream and a program identifier, wherein the data contents are related to a television program;

constructing a database by forming an integrated information of a channel/program identifier information and data contents in connection with one another, wherein the channel/program identifier information is an intrinsic identifier related to the television program, and the intrinsic identifier includes a television channel ID, television program ID, and data contents ID;

judging whether or not the data contents to be displayed and a current A/V signal are consistent with each other according to the integrated information;

performing conversion of data contents if it is found that the data contents to be displayed are not consistent with the current A/V signal, and not performing the conversion of the data contents if it is found that the data contents to be displayed are consistent with the current A/V signal; and displaying the A/V signal and the data contents upon receipt of the data contents corresponding to the A/V signal, wherein the conversion of data contents includes receiving data content consistent with the current A/V signal, and wherein if a browser function is not operated, only the A/V signal is displayed.

7. The method according to claim 6, wherein, in the displaying step, if the data contents to be displayed are consistent with the current A/V signal according to the integrated information, the A/V signal and the corresponding data contents are displayed.

8. The method according to claim 6, wherein, in the displaying step, if the data contents corresponding to the A/V signal cannot be received again, a message that the A/V signal cannot be displayed or a function of a browser is not operable is displayed.

9. The method according to claim 6, wherein the step of judging whether or not the data contents are consistent with the current A/V signal further comprises:
controlling the channel and a browser according to a user's request; and
storing the A/V signal and data contents from the corresponding channel and site.

10. An apparatus for data contents processing, comprising:
an inverse multiplexing unit configured for separating audio/video (A/V) signals and data contents upon receipt of a broadcast signal of a bit stream and extracting information on a channel of the broadcast signal corresponding to the bit stream and a program identifier, wherein the data contents are related to a television program;
a database constructing unit configured for constructing a database by forming an integrated information of a channel/program identifier information and data contents in connection with one another, wherein the channel/program identifier information is an intrinsic identifier related to the television program, and the intrinsic identifier includes a television channel ID, television program ID, and data contents ID;
an A/V interface control unit configured for judging whether or not the data contents to be displayed and the current A/V signal are consistent with each other according to the integrated information; and
a browser unit configured for displaying to a display unit the current A/V signal and the database contents,
wherein if the A/V interface control unit judges that the data contents to be displayed are not consistent with the current A/V signal according to the integrated information, the browser unit performs conversion of data content and displays to the display unit the A/V signal and the data contents upon receipt of the data contents corresponding to the A/V signal, wherein if the A/V interface control unit judges that the data contents to be displayed are consistent with the current A/V signal according to the integrated information, the browser unit displays to the display unit the A/V signal and the data contents upon receipt of the data contents corresponding to the A/V signal without performing the conversion of data, wherein the conversion of data contents includes receiving data content consistent with the current A/V signal, and wherein, when the user selects data contents by means of a forward/backward function of the browser, the A/V data interface control unit checks whether or not the currently displayed channel corresponds to the selected data contents according to the integrated information, and, if the channel does not correspond to the selected contents, the A/V data interface control unit controls the inverse multiplexing unit to tune in to the channel corresponding to the selected data contents.

11. The apparatus according to claim 10, wherein the browser unit further comprises a forward/backward function.

12. The apparatus according to claim 10, wherein the display unit displays the A/V signal outputted from the inverse multiplexing unit.

13. The apparatus according to claim 10, wherein the database constructing unit further comprises a storage unit for storing the separated data contents.

14. The apparatus according to claim 10, wherein the integrated information is a tree data structure in which a plurality of programs corresponding to one channel are connected to the channel, and a plurality of data contents corresponding to each program are connected to the program.

15. The apparatus according to claim 10, wherein, when the user converts the channel using a channel conversion key, the A/V data interface control unit checks whether or not the currently displayed data contents are the data contents corresponding to the converted channel according to the integrated information, and, if the currently displayed data contents are not the data contents corresponding to the converted channel, the A/V data interface control unit controls the browser to select the data contents corresponding to the converted channel.

16. The method according to claim 1, wherein a forward/backward function of the browser is used to select the data contents.

17. A data content processing method comprising:
receiving a bit stream of a broadcast signal;
separating audio/video (A/V) signals from data contents from the bit stream of a selected channel, wherein the data contents are related to a television program;
upon receipt of a channel change request, determining whether current data contents correspond to the requested channel, changing the data contents to correspond to the requested channel if it is determined that the current data contents do not correspond to the requested channel, and taking no action to change the data contents if it is determined that the current data contents do correspond to the requested channel, wherein the requested channel becomes the selected channel;

upon receipt of a data content change request, determining whether a current channel corresponds to the requested data content change, changing the channel to correspond to the requested data content change if it is determined that the current channel does not correspond to the requested data content change, and taking no action to change the channel if it is determined that the current channel does correspond to the requested data content change, wherein the changed channel becomes the selected channel; and displaying A/V signals and corresponding data contents of the selected channel based on an integrated information of a channel/program identifier information and the data contents in connection with one another, wherein the channel/program identifier information is an intrinsic identifier related to the television program, and the intrinsic identifier includes a television channel ID, television program ID, and data contents ID.

18. The method of claim 17, wherein in the displaying step, if a browser unit is not operating, displaying the A/V signals of the selected channel only.

19. The method of claim 17, wherein upon receipt of the data content change request, the method further comprises:
determining whether the requested content is in a local storage;
retrieving the requested content from the local storage if it is determined that the requested content is in the local storage; and
retrieving the requested content from the received bit stream if it is determined that the requested content is not in the local storage.

20. The method of claim 19, wherein if the requested content is not in the local storage and the requested content cannot be retrieved from the received bit stream, the method further comprises displaying a message indicating that the requested content cannot be displayed.

21. The method of claim 17, further comprising constructing a database of integrated information of channels and corresponding data contents from the received bit stream.

22. The method of claim 21, wherein the step of determining whether current data contents correspond to the requested channel change, is performed based on the database of the integrated information.

23. The method of claim 21, wherein the step of determining whether the current channel corresponds to the requested data content change, is performed based on the database of the integrated information.

24. An apparatus to perform data content processing, comprising:
an inverse multiplexer configured for receiving a bit stream of a broadcast signal and for separating audio/video (A/V) signals from data contents from the bit stream of a selected channel, wherein the data contents are related to a television program;
a browser configured for controlling display of the data contents;
a data interface unit configured for:
upon receipt of a channel change request, determining whether current data contents correspond to the requested channel, changing the data contents to correspond to the requested channel if it is determined that the current data contents do not correspond to the requested channel, and taking no action to change the data contents if it is determined that the current data contents do correspond to the requested channel, wherein the requested channel becomes the selected channel; and upon receipt of a data content change request, determining whether a current channel corresponds to the requested data content change, changing the channel to correspond to the requested data content change if it is determined that the current channel does not correspond to the requested data content change, and taking no action to change the channel if it is determined that the current channel does correspond to the requested data content change, wherein the changed channel becomes the selected channel; and a display unit for displaying A/V signals and corresponding data contents of the selected channel based on an integrated information of a channel/program identifier information and the data contents in connection with one another, wherein the channel/program identifier information is an intrinsic identifier related to the television program, and the intrinsic identifier includes a television channel ID, television program ID, and data contents ID.

25. The apparatus of claim 24, wherein if the browser unit is not operating, the display unit is configured for displaying the A/V signals of the selected channel only.

26. The apparatus of claim 24, wherein upon receipt of the data content change request, the data interface unit is configured for:
determining whether the requested content is in a local storage;
controlling the browser to retrieve the requested content from the local storage if it is determined that the requested content is in the local storage; and
controlling the browser to retrieve the requested content from the received bit stream if it is determined that the requested content is not in the local storage.

27. The apparatus of claim 26, wherein if the browser determines that the requested content is not in the local storage and the requested content cannot be retrieved from the received bit stream, the data interface unit is configured for controlling the display unit to display a message indicating that the requested content cannot be displayed.

28. The apparatus of claim 24, further comprising a database constructing unit configured for constructing a database of integrated information of channels and corresponding data contents received from the inverse multiplexer.

29. The apparatus of claim 28, wherein the data interface unit determines whether current data contents correspond to the requested channel change based on the database of the integrated information.

30. The apparatus of claim 28, wherein the data interface unit determines whether the current channel corresponds to the requested data content change based on the database of the integrated information.

* * * * *